United States Patent
Li et al.

(10) Patent No.: US 6,999,461 B2
(45) Date of Patent: Feb. 14, 2006

(54) ROUTING SCHEMES FOR PACKET SWITCHING NETWORKS

(75) Inventors: Shuo-Yen Robert Li, Shatin (HK); Jian Zhu, Shenzhen (CN); Chu Man Lau, Ma On Shan (HK); Wan Lam, Shatin (HK)

(73) Assignee: Industrial Technology Research Institute, Hsinchu (TW)

( * ) Notice: Subject to any disclaimer, the term of this patent is extended or adjusted under 35 U.S.C. 154(b) by 855 days.

(21) Appl. No.: 09/881,870

(22) Filed: Jun. 15, 2001

(65) Prior Publication Data

US 2004/0066799 A1    Apr. 8, 2004

Related U.S. Application Data

(60) Provisional application No. 60/212,333, filed on Jun. 16, 2000.

(51) Int. Cl.
H04L 12/28    (2006.01)

(52) U.S. Cl. .................. 370/400; 370/389; 370/401; 370/410

(58) Field of Classification Search ................ 370/389, 370/400, 401, 396, 395.1, 474, 410
See application file for complete search history.

(56) References Cited

U.S. PATENT DOCUMENTS

| | | | |
|---|---|---|---|
| 4,523,273 A | 6/1985 | Adams et al. | |
| 4,623,996 A | 11/1986 | McMillen | |
| 4,852,091 A | 7/1989 | Li | |
| 4,899,334 A | 2/1990 | Shimizu | |
| 4,905,225 A | 2/1990 | Francois et al. | |
| 4,945,534 A | 7/1990 | Driscoll et al. | |
| 4,955,017 A | 9/1990 | Eng et al. | |
| 4,970,507 A | 11/1990 | Cooperman et al. | |
| 5,123,011 A | 6/1992 | Hein et al. | |
| 5,148,428 A | 9/1992 | Lee | |
| 5,166,926 A | 11/1992 | Cisneros et al. | |
| 5,184,346 A | 2/1993 | Kozaki et al. | |
| 5,216,668 A | 6/1993 | Zhang | |
| 5,299,317 A | 3/1994 | Chen et al. | |
| 5,303,383 A | 4/1994 | Neches et al. | |
| 5,353,283 A * | 10/1994 | Tsuchiya | 370/392 |
| 5,367,518 A | 11/1994 | Newman | |
| 5,367,520 A | 11/1994 | Cordell | |
| 5,369,635 A | 11/1994 | Gandini et al. | |
| 5,371,495 A | 12/1994 | Sturges et al. | |
| 5,396,231 A | 3/1995 | Hein | |
| 5,426,733 A | 6/1995 | Masui | |
| 5,450,074 A | 9/1995 | Yoshifuji | |

(Continued)

*Primary Examiner*—Ajit Patel
*Assistant Examiner*—Andrew C. Lee
(74) *Attorney, Agent, or Firm*—Akin Gump Strauss Hauer & Feld, LLP (57) ABSTRACT

New routing techniques over a packet switching network so that the protocol processing at inter-node line cards is drastically simplified or even eliminated altogether. These techniques utilize an ingress node of the packet switching network for translating the routing information into a fixed route encoded as a sequence of in-band control signals, fragmenting the packet into cells of a fixed length, and affixing the sequence of in-band control signals in front of each of the cells, deploying the in-band control signals in a sequence in nodes on the route to guide each of the cells through the sequence of nodes and then consuming the in-band control signals, and at an egress node reassembling the cells into the packet.

10 Claims, 9 Drawing Sheets

U.S. PATENT DOCUMENTS

| | | | |
|---|---|---|---|
| 5,451,936 | A | 9/1995 | Yang et al. |
| 5,471,628 | A | 11/1995 | Phillips et al. |
| 5,483,541 | A | 1/1996 | Linsky |
| 5,500,858 | A | 3/1996 | McKeown |
| 5,506,840 | A | 4/1996 | Pauwels et al. |
| 5,517,495 | A | 5/1996 | Lund et al. |
| 5,541,914 | A | 7/1996 | Krishnamoorthy et al. |
| 5,566,179 | A | 10/1996 | Kobayashi et al. |
| 5,568,477 | A | 10/1996 | Galand et al. |
| 5,583,861 | A | 12/1996 | Holden |
| 5,600,630 | A * | 2/1997 | Takano et al. ............... 370/218 |
| 5,602,844 | A | 2/1997 | Lyles |
| 5,623,698 | A | 4/1997 | Stephenson et al. |
| 5,671,222 | A | 9/1997 | Chen et al. |
| 5,689,505 | A | 11/1997 | Chiussi et al. |
| 5,689,506 | A | 11/1997 | Chiussi et al. |
| 5,724,349 | A | 3/1998 | Cloonan et al. |
| 5,724,351 | A | 3/1998 | Chao et al. |
| 5,768,270 | A | 6/1998 | Ha-Duong |
| 5,802,052 | A | 9/1998 | Venkataraman |
| 5,809,021 | A | 9/1998 | Diaz et al. |
| 5,841,775 | A | 11/1998 | Huang |
| 5,852,407 | A | 12/1998 | Ishii et al. |
| 5,859,846 | A | 1/1999 | Kim et al. |
| 5,896,371 | A | 4/1999 | Kobayashi et al. |
| 5,940,389 | A | 8/1999 | Yang et al. |
| 5,949,778 | A | 9/1999 | Abu-Amara et al. |
| 5,963,554 | A | 10/1999 | Song |
| 5,987,028 | A | 11/1999 | Yang et al. |
| 6,052,373 | A | 4/2000 | Lau |
| 6,058,112 | A | 5/2000 | Kerstein et al. |
| 6,067,298 | A | 5/2000 | Shinohara |
| 6,081,512 | A | 6/2000 | Muller et al. |
| 6,157,643 | A | 12/2000 | Ma |
| 6,160,806 | A | 12/2000 | Cantwell et al. |
| 6,215,786 | B1 | 4/2001 | Larson et al. |
| 6,219,349 | B1 | 4/2001 | Kobayashi et al. |
| 6,259,699 | B1 | 7/2001 | Opalka et al. |
| 6,307,854 | B1 | 10/2001 | Webb |
| 6,335,930 | B1 | 1/2002 | Lee |
| 6,370,155 | B1 | 4/2002 | Cantwell et al. |
| 6,400,708 | B1 | 6/2002 | Bartholomew et al. |
| 6,427,037 | B1 | 7/2002 | Okayama |
| 6,473,827 | B1 | 10/2002 | McMillen et al. |
| 6,493,347 | B1 * | 12/2002 | Sindhu et al. ............... 370/401 |
| 6,553,031 | B1 * | 4/2003 | Nakamura et al. .......... 370/392 |
| 6,556,725 | B1 | 4/2003 | Kondo et al. |
| 6,563,819 | B1 | 5/2003 | Park |
| 6,563,837 | B1 | 5/2003 | Krishna et al. |
| 6,600,741 | B1 * | 7/2003 | Chrin et al. ................. 370/375 |
| 6,611,519 | B1 | 8/2003 | Howe |
| 6,621,828 | B1 | 9/2003 | Field et al. |
| 6,628,651 | B1 | 9/2003 | Ryan et al. |
| 6,647,017 | B1 | 11/2003 | Heimann |
| 6,657,998 | B1 | 12/2003 | Li |
| 6,714,562 | B1 | 3/2004 | Calvignac et al. |
| 6,721,324 | B1 | 4/2004 | Shinohara |
| 6,735,203 | B1 | 5/2004 | Heiman |
| 6,757,282 | B1 | 6/2004 | Ofek |
| 6,798,777 | B1 * | 9/2004 | Ferguson et al. ............ 370/392 |
| 6,829,237 | B1 | 12/2004 | Carson et al. |
| 6,834,038 | B1 | 12/2004 | Zelig et al. |
| 6,850,524 | B1 * | 2/2005 | Troxel et al. .......... 370/395.32 |
| 2002/0018475 | A1 | 2/2002 | Ofek et al. |
| 2002/0031124 | A1 | 3/2002 | Li |
| 2002/0176526 | A1 | 11/2002 | Mejia |

\* cited by examiner

ROUTING SCHEMES FOR PACKET SWITCHING NETWORKS

CROSS-REFERENCE TO RELATED APPLICATION

This application is a non-provisional application of provisional application Ser. No. 60/212,333 filed Jun. 16, 2000 entitled "Algebraic switching systems and broadband applications thereof", the contents of which are hereby incorporated by reference in their entirety.

BACKGROUND OF THE DISCLOSURE

1. Field of the Invention

The invention relates to methods for efficiently routing a packet in a packet switching network and, more particularly, for providing. flexibility and significant complexity reduction in implementation of such networks; and packet switching networks incorporating such methods.

2. Description of the Background Art

Figure 1:
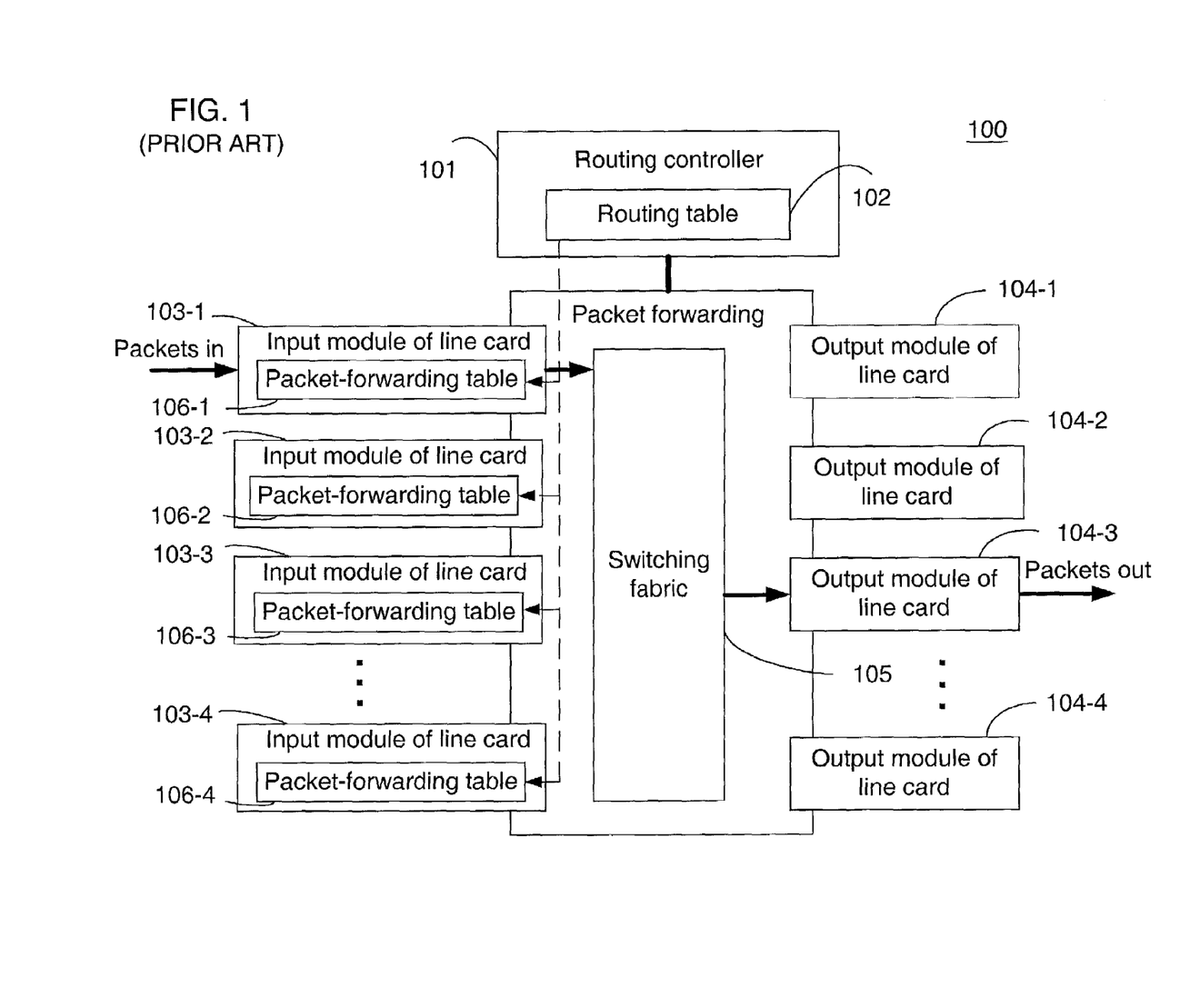
FIG. 1 is a block diagram of a packet switch of the prior art.

A packet switch 100, sometimes called a "router", is depicted by FIG. 1. Key components in it includes a number of "line interface cards" (or simply called "line cards"), a "switching fabric" 105, and a routing controller 101. A physical line card includes two logical parts, the "input module" 103-1 and the "output module" 104-1, which provide physical interface to packet generators and receivers. The switching fabric 105 provides the infrastructure for moving packets between input modules 103-1, 103-2, 103-3, 103-4 of line cards and output modules 104-1, 104-2, 104-3, 104-4 of line cards. The routing controller 101 uses various routing protocols to exchange information with other packet switches to build and maintain a routing table 102. The input module 103-1 of each line card includes or corresponds to a packet-forwarding table 106-1, which contains partial content of the routing table 102. Packets, in either fixed or variable lengths, enter the switch via the input module 103-1 of a line card. The input module identifies the routing information from the packet header, searches the packet-forwarding table for a match, and translates into a "switching header". The switching header typically contains the in-band control signals for the switching fabric 105, QoS (quality of service) information, etc. More often than not in broadband switching, the incoming packet is segmented into "cells" of a fixed length. Assume that this is the case. Before a cell enters the switching fabric, the switching header prefixes the cell for guiding the cell through the switching fabric 105 toward an appropriate output. The cell then arrives at the output module of a line card. The output module reassembles cells back into the packet format.

Figure 2:
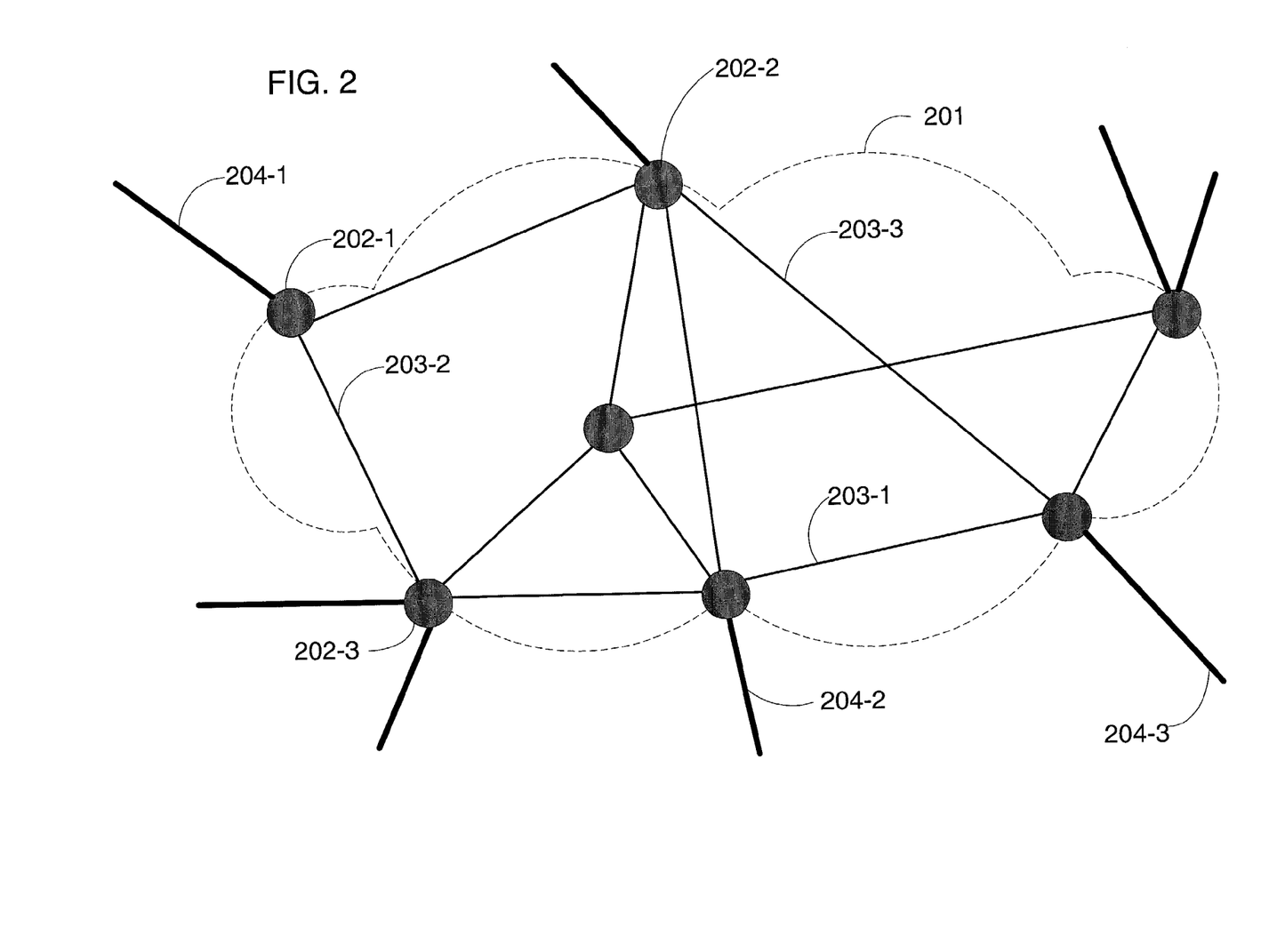
FIG. 2 is a block diagram of a packet switching network of packet switches.

FIG. 2 depicts the general topology of a "packet switching network" 201 which is an interconnection network of a number of packet switches. Packet switches in the network are called "nodes" 202-1, 202-2, 202-3, . . . , of the network. All nodes are directly or indirectly interconnected to one another through "inter-node links" 203-1, 203-2, 203-3, . . . , which are communication channels.

Besides inter-node links, there can be other types of communication channels connected to a packet switch, e.g., channels linking the switching fabric to packet generators/receivers. All these communication channels are hosted by line cards on the packet switch. Those line cards hosting inter-node links 203-1, 203-2, 203-3, . . . , will be called "inter-node line cards". The remaining line cards hosting 204-1, 204-2, 204-3, . . . , host other communication channels.

When a packet switching network, including the nodes and the inter-node links, is viewed as a large packet switching system, it is functionally equivalent to a large packet switch with a large throughput but enjoys two major advantages over the single-switch equivalent. First, a single packet switch with such a large throughput may not be economically feasible. Second, because of the geographic distribution of the nodes in the network, the average distance from a user to the network is shorter than that to the single packet switch. On the other hand, the deployment of a packet switching network instead of a single packet switch incurs the cost of inter-node line cards. This cost is a substantial overhead because, typically, the bulk of the cost of a packet switch is in the line cards.

A packet enters a packet switching network at its "ingress node and exits from its "egress node". When the ingress node is not the same as the egress node, there may also possibly intermediate nodes on the packet route. Moreover, there may be different routes available between the ingress node and the egress node. A "routing scheme" refers to a method for selecting and setting up a route. The existing variety of routing schemes can be classified into the following two categories. Because of the 20 overwhelming application in IP (Internet protocol) networks, the routing information carried by a packet header will be abbreviated as "the IP address".

Hop-by-hop Routine.

Each node independently chooses the next hop for an incoming packet. That is, each node analyzes "the IP address", the QoS information, etc. in the packet header and then, based on a routing algorithm/policy or a routing table, chooses a next node for the packet route. In fact, this has been the usual connectionless mode in existing IP networks. The packet-forwarding table in the input module of the line card translates "the IP address" into the output address of the switching-fabric that leads to the next node on the packet route.

Source Routing.

A packet is forced to follow a particular path through the network, which is set at the ingress node of the packet. Thus the input module of the ingress node translates "the IP address" into a fixed route encoded in the form of a sequence of "next-node identifiers" and affixes the sequence in front of the packet. The input module of every node on the packet route performs protocol processing and peels off the leading next-node identifier in the sequence and uses it as a substitute for "the IP address" in the switching control. Since the next-node identifier is much simpler than "the IP address", the packet-forwarding table for the translation from the next-node identifier is much smaller than that for the translation from "the IP address". Reducing the size of the packet-forwarding table also reduces the space-and time-complexities of the operation. The input module of an inter-node line card needs only perform this reduced operation, and hence its cost can be lower than a regular input module.

As mentioned in the above, there are advantages in a packet switching network over a single large packet switch but there is also the disadvantage in the cost of inter-node line cards. A source-routing scheme over a packet switching network alleviates this disadvantage by somewhat reducing the cost of the input module of internode line cards. However, source coding incurs the overhead in packet formatting by carrying the sequence of next-node identifiers, which encode the whole packet route through the network.

It would be desirable if the cost of inter-node line cards can be further reduced or even eliminated altogether.

SUMMARY OF THE INVENTION

The bulk of the cost of a packet switch is in the line cards. Hence the cost of inter-node line cards is a substantial overhead incurred in the deployment of a packet switching network instead of a single large packet switch. This invention presents two new routing schemes over a packet switching network so that the protocol processing at inter-node line cards is drastically simplified or even eliminated altogether, and the packet switching networks incorporating such methods.

In accordance with one broad method aspect of the present invention, a method for routing a packet through a network composed of a plurality of switches as nodes, the packet having a packet header containing routing information and destined to traverse the network via a route which is determined by a sequence of nodes, wherein the first of the sequence of nodes is the ingress node through which the packet enters the network, and the last of the sequence of nodes is the egress node through which the packet exits from the network, includes (a) in the ingress node of the network: (1) translating the routing information into the route encoded as a sequence of in-band control signals; (2) fragmenting the packet into cells of a fixed length; (3) and affixing the sequence of in-band control signals in front of each one of the cells, (b) in each one of the sequence of nodes on the route, including the ingress node and the egress node: (1) deploying a corresponding one of the sequence of the in-band control signals in front of each one of the cells to guide said each one of the cells through said each one of the sequence of nodes; and (2) consuming said corresponding in-band control signal from the sequence of the in-band control signals of said each one of the cells; and (3) reassembling the cells into the packet in the egress node of the network.

In accordance with another broad method aspect of the present invention, a method for routing a packet through a network composed of a plurality of switches as nodes, each of the nodes having a switching fabric, the packet having a packet header containing routing information and destined to traverse the network via a route which is determined by a sequence of k nodes, $k \geq 1$, wherein the first of the sequence of nodes is the ingress node through which the packet enters the network, the last of the sequence of nodes is the egress node through which the packet exits from the network, includes (a) in the ingress node of the network: (1) translating the routing information into a first in-band control signal for the switching control over the switching fabric of the ingress node, a route tag, and a last in-band control signal for the switching control over the switching fabric of the egress node; (2) fragmenting the packet into cells of a fixed length; (3) affixing a cell header including said first in-band control signal, said route tag and said last in-band control signal in front of each one of the cells; (4) deploying said first in-band control signal in the cell header of each one of the cells to guide said each one of the cells through the ingress node; and (5) consuming said first in-band control signal from the cell header of said each one of the cells, (b) in the j-th node on the route, $2 \leq j \leq (k-1)$: (1) inserting a j-th in-band control signal into the cell header of each one of the cells for the switching control over the switching fabric of said j-th node on the route, wherein said j-th in-band control signal is derived from the route tag in the cell header of each one of the cells; (2) deploying said j-th in-band control signal in the cell header of each one of the cells to guide said each one of the cells through said j-th node on the route; and (3) consuming said j-th in-band control signal from the cell header of each one of the cells, and (c) in the egress node of the network: (1) deploying the last in-band control signal for the egress node in front of each one of the cells to guide said each one of the cells through the egress node; and (2) reassembling the cells into the packet.

Broad system aspects of the present invention are commensurate with these broad method aspects.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention improves on the conventional source-routing scheme stated in Description of the Background Art. Certain commonly seen characteristics of the packet switching network are assumed:

(1) Packets are routed through the network in the form of fixed-length cells.
(2) There are at most N nodes on the route of a packet through the network. For example, N can be as small as 2 only when there exists an inter-node link from every node to every other.

In principle QoS information can be included in the switching header of the cells as part of the in-band control signal. However, in order to simplify the descriptions of the embodiment, the inclusion of the QoS information will be omitted.

1. One Illustrative Embodiment—a New Source-routing Scheme

Under the conventional scheme of source routing, the input module of the ingress node translates "the IP address" into a fixed route encoded in the form of a sequence of "next-node identifiers". The input module of every node on the packet route peels off the leading next-node identifier in the sequence and uses it in the switching control as a substitute for "the IP address". One embodiment of the present invention makes the following highlighted modifications over conventional source routing:

(1) The code for the fixed route is affixed as a switching header in front of every cell of the packet instead of the packet itself.

(2) The input module of only the ingress node fragments the packet into cells, and the output module of only the egress node reassembles cells into the packet. In between, the switching header of every cell carries the routing information to guide the cell through the switching fabric of every node on the route.

(3) The code for the fixed route is composed of a sequence of "in-band control signals" instead of next-node identifiers. Switching control at every node on the route consumes the leading in-band control signal in the sequence. At each node, the in-band control signal, without the need of further translation, guides the cell through the switching fabric. Except for the case of the egress node, the cell is switched into one of the outputs designated for feeding into an outgoing inter-node link; the identity of this inter-node link implies the identity of the next node on the route.

(4) A bi-directional inter-node link may be regarded as a pair of uni-directional inter-node links in opposite directions. The output module of the line card at the originating end of a uni-directional inter-node link processes the cell for the transmission, and the input module of the line card at the terminating end of that link processes the reception. Besides such processing for the purpose of transmission/reception per se, there is no protocol processing at inter-node line cards. Thus the switching fabrics at all nodes are logically integrated into a single in-band-control switching fabric and the inter-node links become logically equivalent to interconnection lines among elements in the single switching fabric.

Figure 3A:
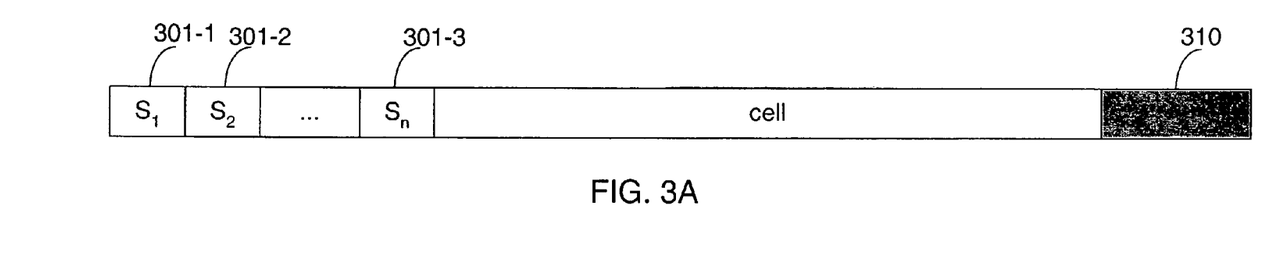
FIGS. 3A–C depict the cell formats in the inventive source-routing scheme.
Figure 3B:
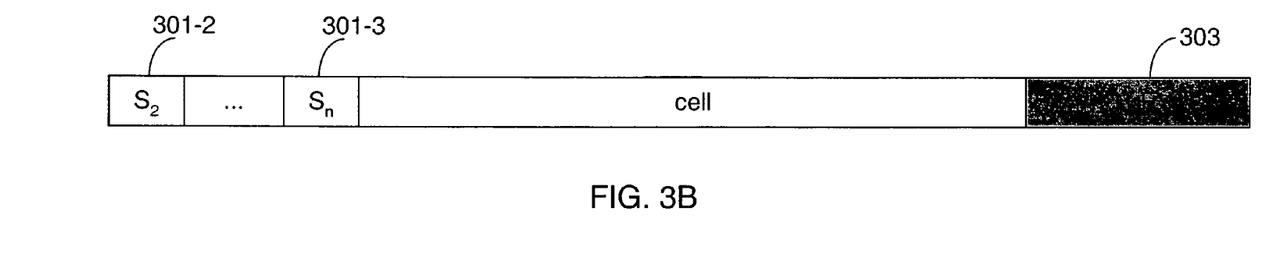
Figure 3C:
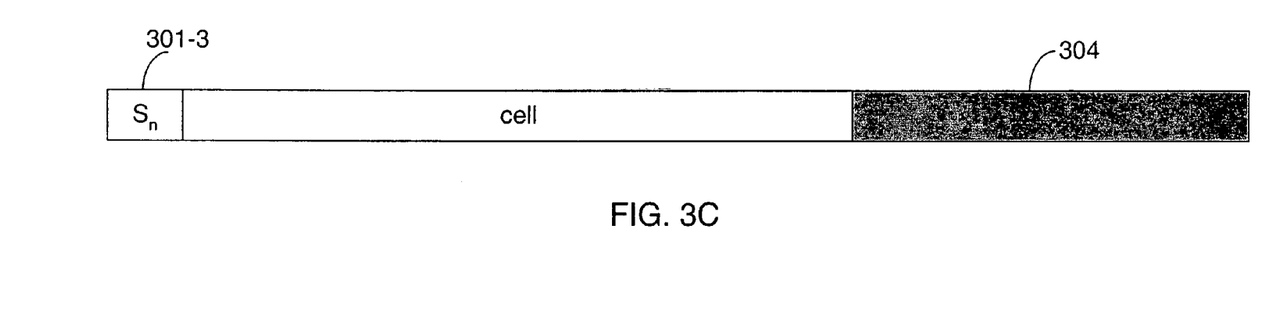

Assume that there are a total of n nodes, $1 \leq n \leq N$, on the fixed route of a particular packet, including the ingress node and the egress node. The input module of the line card at the ingress node, which is not an inter-node line card, uses the packet-forwarding table to translate "the IP address" of a packet into a fixed route encoded in the form of a sequence of n in-band control signals, each for the switching control over the switching fabric of each node on the packet route. Meanwhile, the packet is fragmented into cells. The sequence of in-band control signals is then affixed in front of every cell. The cell format is illustrated in FIG. 3A before the cell enters the switching fabric of the ingress node. The symbols $S_1$ 301-1, $S_2$ 301-2, . . . , $S_n$ 301-3 stand for the in-band control signals to guide the cell through the switching fabric in the n sequential nodes. When n<N, a space filler 310 of N−n times the length an in-band control signal is appended at the end. Switching control at the ingress node consumes the in-band control signal control $S_1$ 301-1. Afterwards, the cell format becomes as depicted by FIG. 3B if n>1, that is, if the ingress node is not the egress node; the cell in this format is then transmitted through the inter-node link without protocol processing at either end of the link (except for the processing for the purpose of transmission/reception per se) and enters the switching fabric of the next node. Switching control at the second node on the route, if n>1, consumes the in-band control signal control $S_2$ 301-2. And so on. FIG. 3C depicts the cell format upon entering the egress node. Space fillers 303 and 304 are increased to account for the consumed signal controls.

Figure 4:
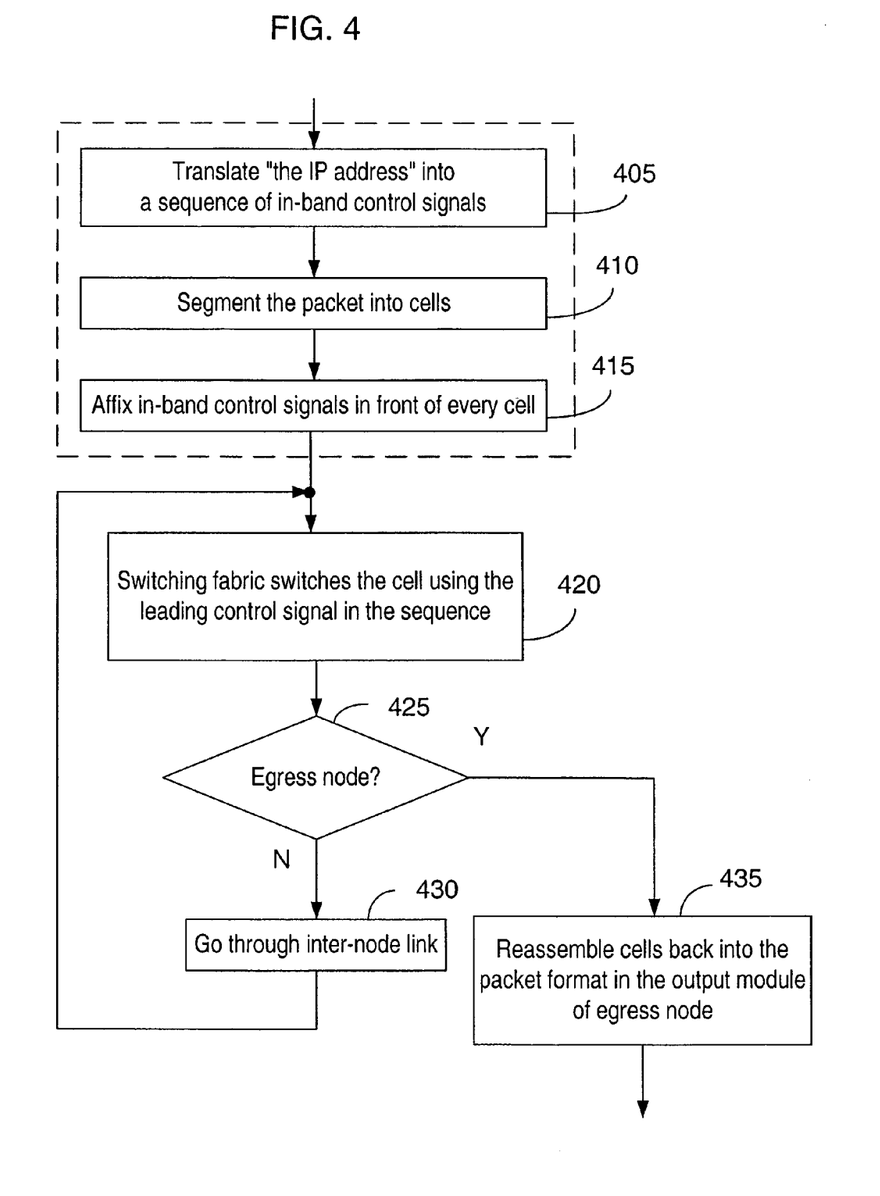
FIG. 4 is a flow diagram of the inventive source-routing scheme.

FIG. 4 presents the flow diagram of this new source-routing scheme, as follows:

Processing block 405: translate "the IP address" into a sequence of in-band control signals Processing block 410: segment the packet into cells Processing block 415: affix in-band control signals in front of every cell Processing block 420: switching fabric switches the cell using the leading control signal in the sequence Processing block 425: determine if the node is an egress node Processing block 430: if not, go through inter-node link Processing block 435: if so, reassemble cells back into the packet format in the output module of egress node This source-routing scheme in accordance with the present invention eliminates protocol processing at both ends of an inter-node link except the processing for the purpose of transmission/reception per se. Thus the inter-node line cards are can be regarded as eliminated or reduced to simple transceiver cards. Switching fabrics at all nodes and the inter-node links are logically integrated into a single in-band-control switching fabric, and every inter-node link is rendered an interconnection line in this logical in-band-control switching fabric. Therefore, a single in-band-control switching fabric can be constructed by the interconnection of switching fabrics in all nodes by the inter-node links.

2. Elimination of Serial-parallel Conversion by the New Source-routing Scheme

In fact, the new source-routing scheme sometimes also simplifies the processing for transmission/reception at the two ends of an inter-node link. In a broadband communication network, inter-node and inter-network transmission is often over a medium at an ultra-broad bandwidth (e.g., gigabits per second), such as an optic fiber or even a wavelength over a wavelength-division optic fiber. On the other hand, the typical transmission bandwidth over an electrical wire is typically only megabits per second. Thus inter-node transmission in packet switching very often can be described as follows and depicted by FIG. 5. At the output module of an inter-node line card, transmission over, say, K wires 501-1, 501-2, . . . , 501-3 are multiplexed by the multiplexer 502 into a single-stream transmission 503 over the inter-node link. At the input module of an inter-node line card, the single-stream transmission 503 is demultiplexed by the demultiplexer 504 into transmission over the K wires 505-1, 505-2, . . . , 505-3. They are two ways to interpret this system of inter-node transmission:

Most Common Interpretation.

Figure 5:
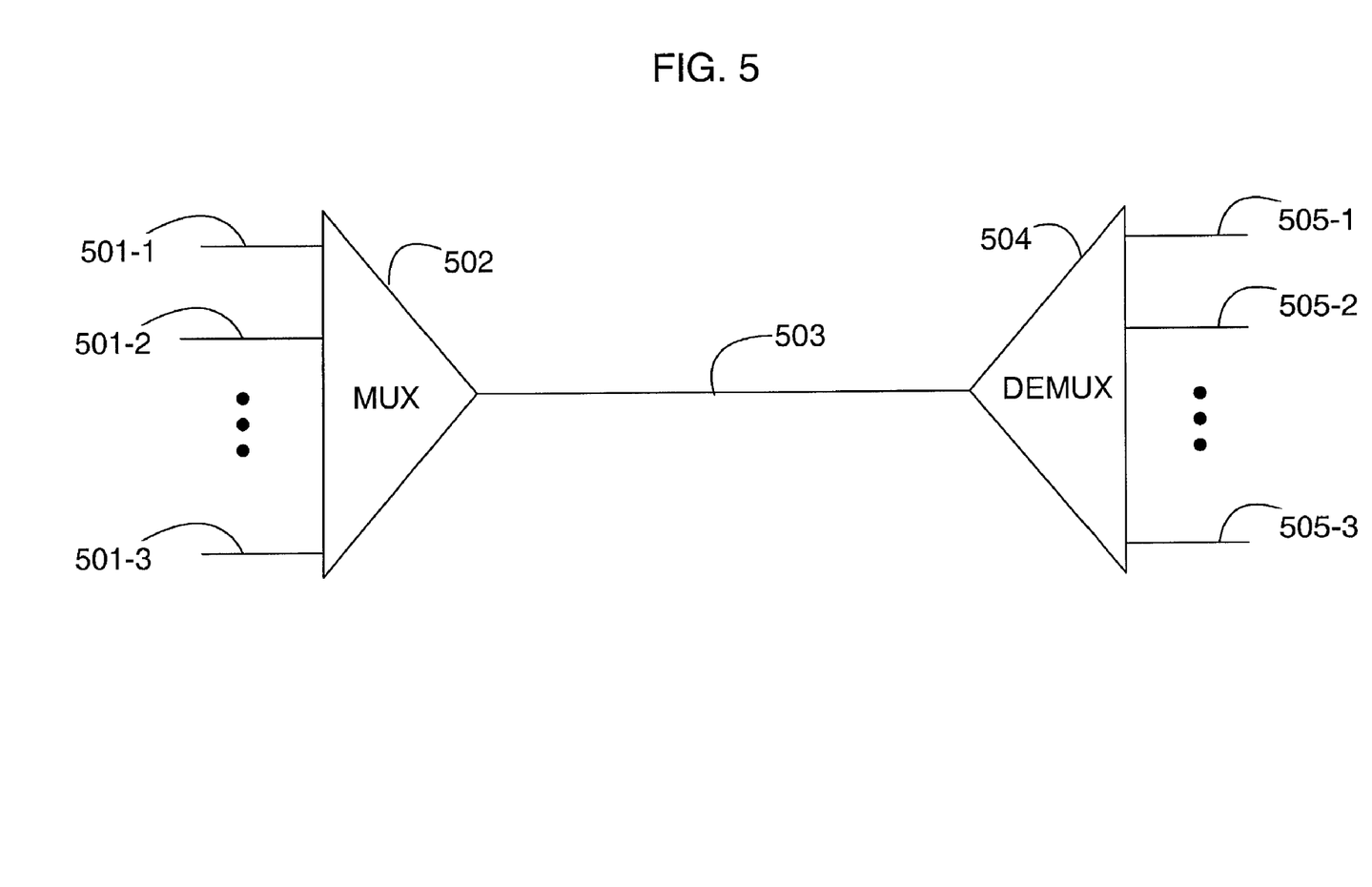
FIG. 5 is a block diagram of multiplexing, transmission, and demultiplexing of data through an inter-node link.

The K wires 501-1, 501-2, . . . , 501-3 represent a K-wire parallel bus. The natural form of a packet upon its generation is in form of a serial bit stream, but this interpretation assumes that somehow the packets have been converted into the K-bit parallel form before getting on the K-wire parallel bus. The multiplexer 502 gathers bits from the K wires on a rotational basis. Over the single-stream transmission 503 the packets are in the serial-bit form. The K wires 505-1, 505-2, . . . , 505-3 again represent a K-wire parallel bus. The demultiplexer 504 distributes bits into the K wires on a rotational basis and thus the packets become in the K-bit parallel form again on the K-wire parallel bus. After going through the inter-node transmission and before arriving at the ultimate receiver of the packets, there has to be the conversion back into the natural form of serial bit stream.

Alternative Interpretation.

The K wires 501-1, 501-2, ..., 501-3 are K separate serial-bit transmission wires, so are the K wires 505-1, 505-2, ..., 505-3. The multiplexer 502 gathers bits from the K wires on a rotational basis. Over the single-stream transmission 503 bits from the K wires are rotationally interleaved. The demultiplexer 504 distributes bits into the K wires on a rotational basis and thus the packets on each of the wires 505-1, 505-2, ..., 505-3 are back into the natural form of serial bits.

Now suppose that a packet routed through the switching fabric at a generic node is in the form of serial bits. Let the new source-routing scheme adopt inter-node transmission as depicted by FIG. 5 under the above alternative interpretation. Then, there is no need of conversion between the serial-and parallel-bit forms throughout the whole packet switching network. In other words, the cost of the serial-to-parallel and parallel-to serial conversions is saved from somewhere in the network.

3. Modification on the New Source-routing Scheme Via Output Grouping

The overhead in cell formatting that the new source-routing scheme incurs is equal to N in-band control signals, where N is the maximum number of nodes on a packet route. There is always some practical limitation on the overhead in cell formatting. This motivates the search of ways to reduce the overhead. Toward this goal, this section modifies the new source-routing scheme when the switching fabric in a generic node of the network pertains to the concept of output grouping.

Consider an in-band-control switching fabric with the following extra characteristics:

(F1) Some or all of the outputs of the switching fabric at a generic node belong to "output groups". A packet may be destined for an output group instead of a single output. In that case, all members within the output group are exchangeable and the objective is to route the packet to any member in the group.

(F2) The in-band control signal that guides a packet toward an output group is in a fixed length shorter than that for guiding the packet toward a single output.

(F3) If a member of an output group feeds into the output module of an inter-node line card, then so do all other members of the group.

EXAMPLE

Figure 6:
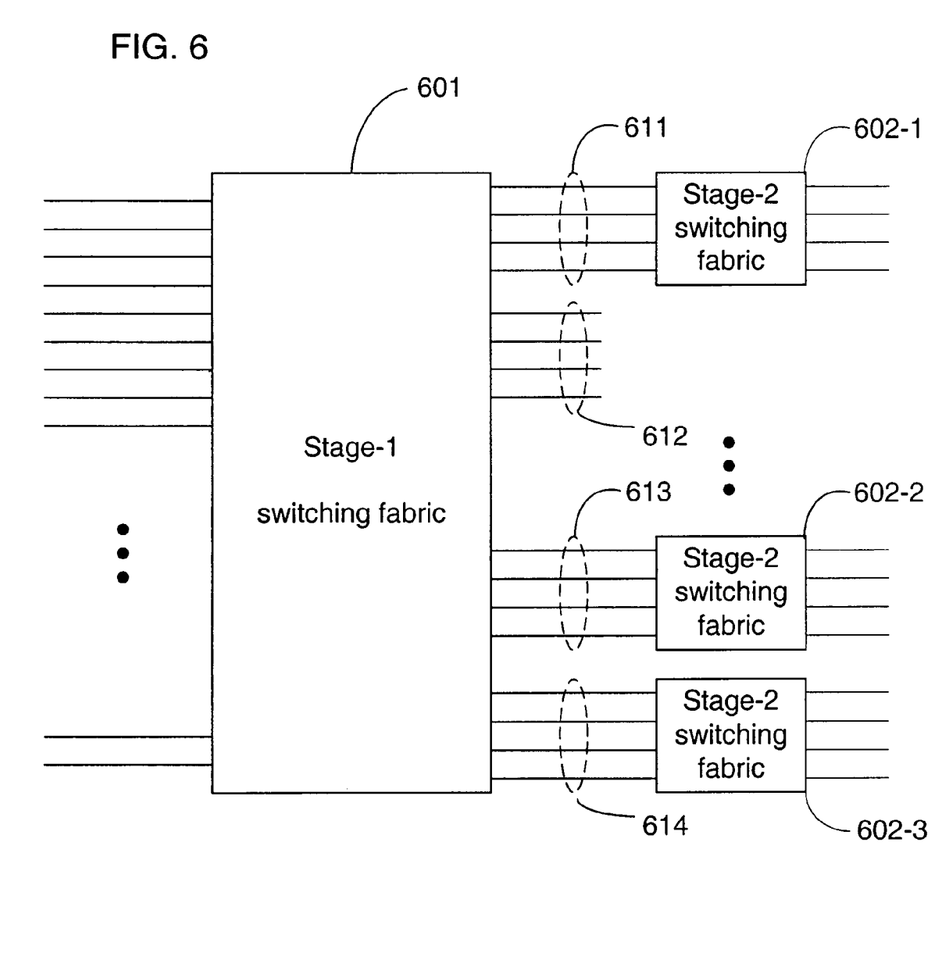
FIG. 6 is a block diagram of a switching fabric pertaining to the concept of output grouping.

An exemplifying in-band-control switching fabric with these characteristics is "2-stage switching fabric" depicted by FIG. 6. At the first stage is a switching fabric 601 with all its outputs belonging to output groups 611, 612, ..., 613, 614 of size K. There are two types of output groups:

Type 1: An output group that feeds directly into the output module of a line card, as exemplified by the output group 612.

Type 2: An output group that feeds through a K×K second-stage switching fabric into the output module of a line card, as exemplified by the output group 611 that feeds into the second-stage switching fabric 602-1.

A cell entering the 2-stage switching fabric is destined for either a Type-1 output group or a single output of a second-stage switching fabric. In the latter case, the in-band control signal comprises two parts, the first part for guiding the cell to the proper output group and the second part for further guiding the cell through the second-stage switching fabric to a particular output. On the other hand, the in-band control signal in the former case is just the first part.

Figure 7A:
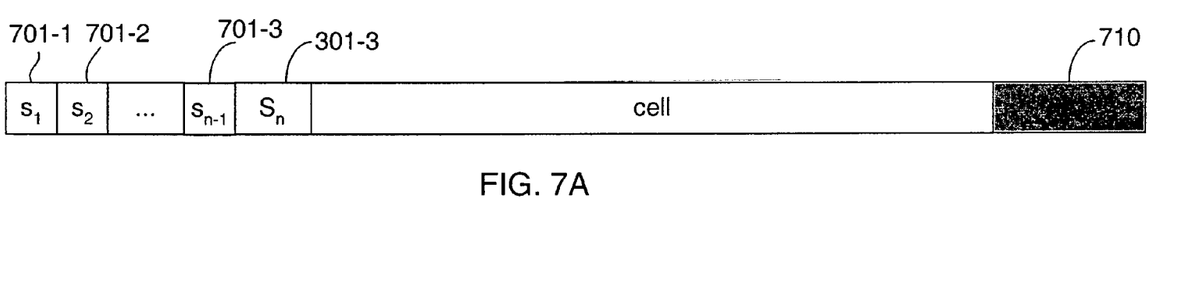
FIGS. 7A–C depict the cell formats in the modified version of the inventive source-routing scheme.

Let the switching fabric at a generic node of the packet switching network be subject to (F1) through (F3). When a cell enters the switching fabric of a non-egress node, it is destined for the output group that feeds into the output module of an inter-node line card. Thus the in-band control signal for guiding the cell through this fabric is of the shorter fixed length. The new source-routing scheme described in Section 1 can then be modified so that all but the final in-band control signals to be affixed in front of every cell are in the shorter fixed length. The cell format before the cell enters the switching fabric of the ingress node is illustrated in FIG. 7A, where n is the number of nodes on a particular route. The n−1 in-band control signals $s_1$ 701-1, $s_2$ 701-2, ..., $s_{n-1}$ 701-3 are short ones, while the final in-band control signal $S_n$ 301-3 is of the normal length. When n<N (N is the maximum number of nodes on a route), a space filler 710 (similar to 310) of N−n times the length of a short in-band-control signal is appended at the end.

Figure 7B:
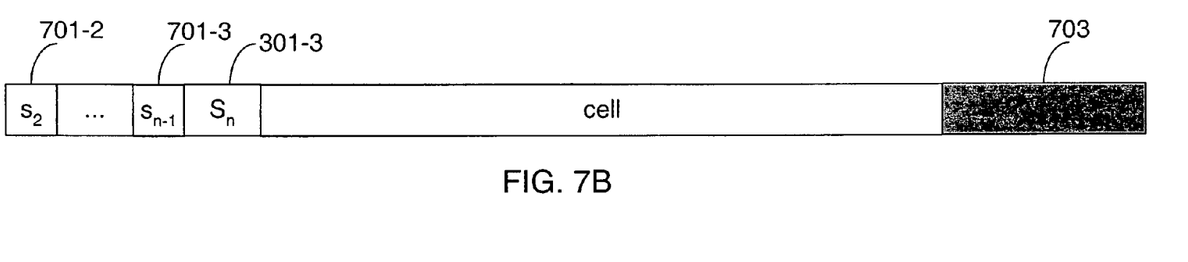
Figure 7C:
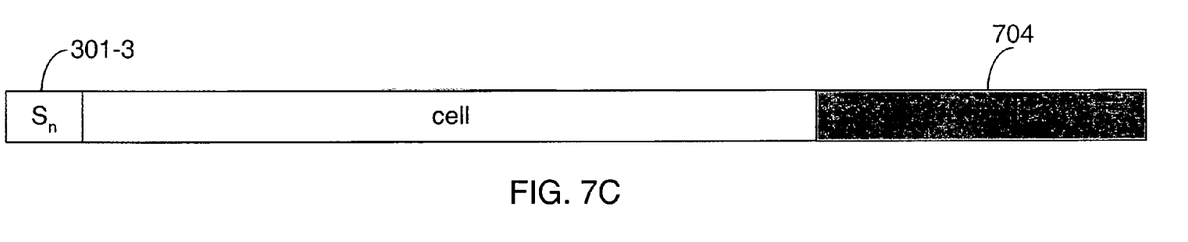

Switching control at the ingress node consumes the in-band control signal control $s_1$ 701-1. Afterwards, the cell format becomes as depicted by FIG. 7B; if n>1, that is, if the ingress node is not the egress node, the cell in this format is then transmitted through the inter-node link without protocol processing at either end of the link (except the processing for the purpose of transmission/reception per se) and enters the switching fabric of the next node. Switching control at the second node on the route consumes the in-band control signal control $s_2$ 701-2. Space filler node 703 serves the same purpose as filler 303. And so on. FIG. 7C depicts the cell format upon entering the egress node. The length of the space filler 704 in this format is N−1 times the length of a short in-band control signal. In contrast, the length of the space filler 304 in the cell format in FIG. 3C is N−1 times the normal length of an in-band-control signal.

4. An Illustrative Hop-by-hop, Routing Scheme

The new source-routing scheme incurs an overhead in cell formatting equal to N in-band control signals, where N is the maximum number of nodes on a packet route. The modified version in Section 3 again incurs an overhead proportional to N. Such overhead can be infeasible for some packet switching networks, especially those networks with large value in N. This section presents another source-routing scheme, referred to as new hop-by-hop routing scheme, which is a modified version of the new source-routing scheme as presented in Section 1, where the overhead in cell formatting is independent of N. Note that the naming of this modified routing scheme as "hop-by-hop" has no relation with the "hop-by-hop routing" mentioned in the Background section, it just serves to differentiate the modified scheme with the scheme in Section 1 that the former has the characteristics of using a simple table-lookup in every hop on the route.

Figure 8A:
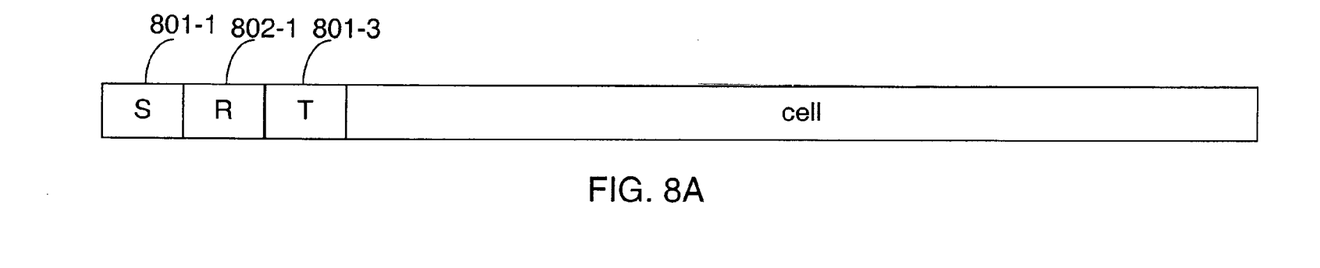
FIGS. 8A–C depict the cell formats in the inventive hop-by-hop routing scheme.

The input module of the line card at the ingress node, which is not an inter-node line card, uses the packet-forwarding table to translate "the IP address" of a packet into a "route tag" and the in-band control signals for the switching control over the switching fabrics of both the ingress node and the egress node (i.e., the destination node). Meanwhile, the packet is fragmented into cells. The sequence of in-band control signals is then affixed in front of every cell. The cell format is illustrated in FIG. 8A before the cell enters the switching fabric of the ingress node. The symbols S 801-1 and T 801-3, respectively, stand for the in-band control signals over the switching fabrics of the ingress node and the egress node. The symbol R 802-1 stands for the route tag, which is for the use of the next node on the route. One particular design of the route tag is simply an identifier of the egress node.

Figure 8B:
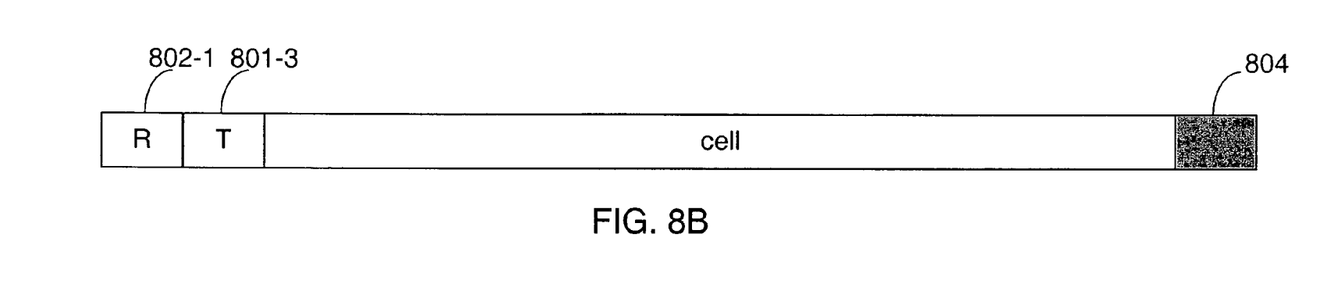
Figure 8C:
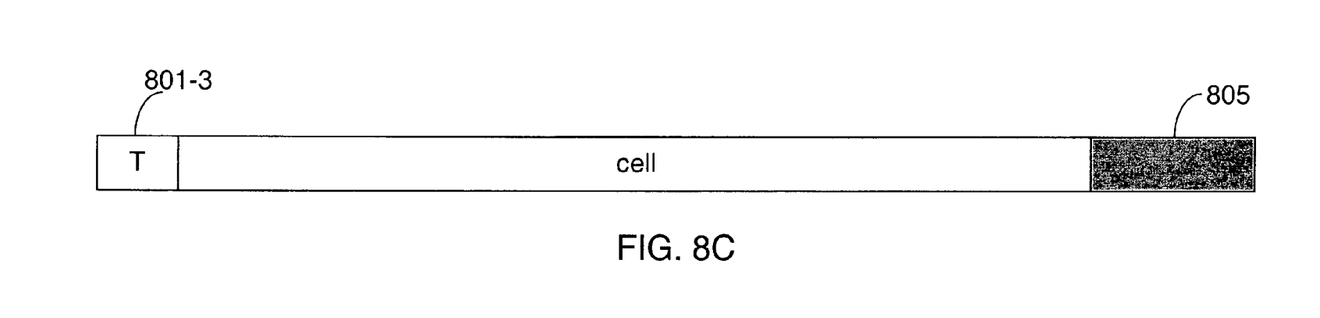

In the degenerated case when the ingress node is also the egress node, "the IP address" is translated into just the in-band control signal over the switching fabric of the egress node, and the cell format is as depicted by FIG. 8C.

Switching control at the ingress node consumes the leading in-band control signal, which is S 801-1 when n>1 and is T 801-3 when n=1. Assume that n>1. After the switching fabric of the ingress node, the cell format becomes as depicted by FIG. 8B. The cell in this format is then transmitted through the output module of an inter-node line card without protocol processing (except for the processing for the purpose of transmission per se) and arrives at the input module of an inter-node line card of the next node. The input module of an inter-node line card maintains a packet-forwarding table, which determines whether a route tag indicates the local node is the egress node of the cell (This table is relatively small, since the route tag is much simpler than "the EP address".)

If so, the route tag is stripped so that the cell format becomes as in FIG. 8C.

Else, the small packet-forwarding table maps the route tag to the in-band-control signal for guiding the cell through the local switching fabric. The small packet-forwarding table may also map the route tag to a new route tag for the use by the subsequent node on the route, unless the route tag is not modified through the route as in the example of using an identifier of the egress node as the route tag. The cell format before entering the switching fabric becomes as in FIG. 8A.

The cell then enters the local switching fabric. In both cases, the cell format is identical to that when the cell was entering the switching fabric of the ingress node. Thus the same procedure can be reiterated at each subsequent node. Finally, the cell reaches the output module of a line card at the egress node, which is not an inter-node line card. The output module receives cells of a packet and reassembles them back into the packet format.

Figure 9:
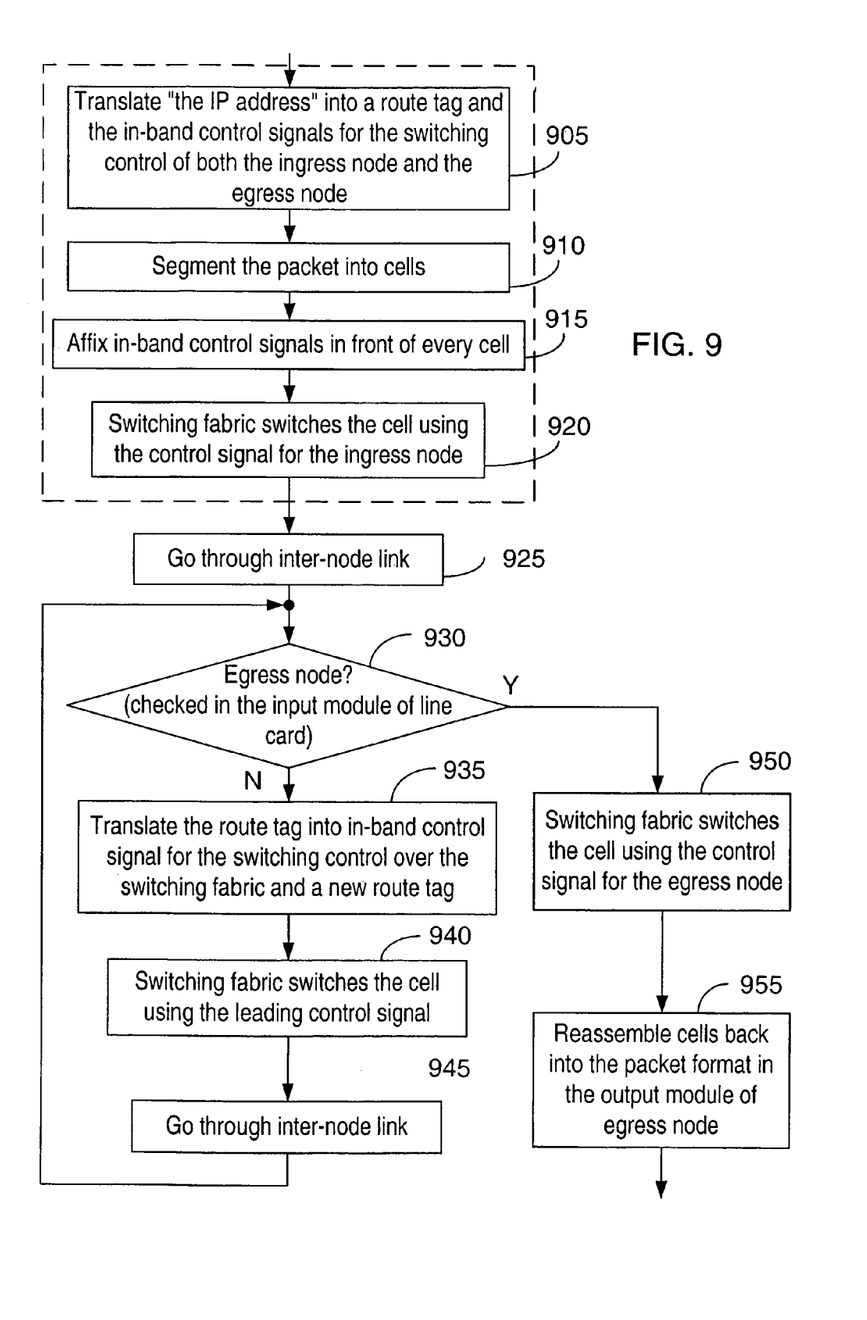
FIG. 9 is a flow diagram of the new hop-by-hop routing scheme.

FIG. 9 presents the flow diagram of this new hop-by-hop routing scheme, as follows:

Processing block 905: translate "the IP address" into a route tag and the in-band control signals for the switching control of both the ingress node and the egress node Processing block 910: segment the packet into cells Processing block 915: affix in-band control signals in front of every cell Processing block 920: switching fabric switches the cell using the control signal for the ingress node Processing block 925: go through inter-node link Processing block 930: determine if an egress node (checked in the input module of line card)

Processing block 935: if not, translate the route tag into in-band control signal for the switching control over the local switching fabric and possibly a new route tag Processing block 940: switching fabric switches the cell using the leading control signal Processing block 945: go through inter-node link Processing block 950: if so, switching fabric switches the cell using the control signal for the egress node Processing block 955: reassemble cells back into the packet format in the output module of egress node.

Although various embodiments which incorporate the teachings of the present invention have been shown and described in detail herein, those skilled in the art can readily devise many other varied embodiments that still incorporate these teachings.

What is claimed is:

1. A method for routing a packet through a packet switching network composed of a plurality of nodes, each of the nodes including a switching fabric with a plurality of input ports, a plurality of output ports, and a plurality of line cards wherein each of the line cards contains an input module and an output module, the packet carrying a packet header containing the routing information and destined to traverse the network via a route which is determined by a sequence of k nodes, $k \geq 1$, wherein the first of the sequence of nodes is the ingress node through which the packet enters the network, the last of the sequence of nodes is the egress node through which the packet exits from the network, and wherein each of the nodes on the route has an active input module through which the packet enters the node and an active output module through which the packet exits from the node, the method comprising:

at the active input module of the ingress node,
   translating the routing information in the packet header into a sequence of k in-band control signals corresponding to the sequence of k nodes on the route,
   fragmenting the packet into a plurality of cells of a fixed length,
   affixing the sequence of k in-band control signals in front of each one of the cells, and
   forwarding each one of the cells to the input port of the switching fabric coupled to the active input module of the ingress node, at the active input module of the j-th node on the route, $1<j \leq k$,
   receiving each one of the cells from the (j–1)-th node on the route, and
   forwarding each one of the cells to the input port of the switching fabric coupled to the active input module of said j-th node, at the switching fabric of the j-th node on the route, $1 \leq j \leq k$,
   routing each one of the cells through the switching fabric of said j-th node, using the j-th one of the sequence of k in-band control signals, to the output port of the switching fabric coupled to the active output module of said j-th node, and
   consuming said j-th in-band control signal, at the active output module of the j-th node on the route, $1 \leq j<k$, transmitting each one of the cells to the (j+1)-th node on the route, and at the active output module of the egress node, reassembling the cells into the packet.

2. The method as recited in claim 1 wherein the output ports of the switching fabric of the j-th node on the route, $1 \leq j<k$, are grouped into a plurality of output groups such that the output ports within the same one of the output groups are exchangeable and each of the output groups of the switching fabric of said j-th node is coupled to one of the output modules of said j-th node, the generating of the sequence of in-band control signals at the active input module of the ingress node includes generating a sequence of k in-band control signals wherein the i-th in-band control signal, $1 \leq j<k$, corresponds to one of the output groups coupled to the active output module of the i-th node on the route, and the k-th in-band control signal corresponds to the output port coupled to the active output module of the egress node, such that the length of an in-band control signal corresponding to an output group is shorter than the length of an in-band control signal corresponding to an output port, and the routing includes routing each one of the cells through the switching fabric of said j-th node, using the j-th one of said sequence of k in-band control signals, to the output group of the switching fabric coupled to the active output module of said j-th node.

3. A method for routing a packet through a network composed of a plurality of switches as nodes, each of the nodes having a switching fabric, the packet having a packet header containing routing information and destined to traverse the network via a route which is determined by a sequence of k nodes, k≧1, wherein the first of the sequence of nodes is the ingress node through which the packet enters the network, the last of the sequence of nodes is the egress node through which the packet exits from the network, the method comprising:

in the ingress node of the network,
      translating the routing information into a first in-band control signal for the switching control over the switching fabric of the ingress node, a route tag, and a last in-band control signal for the switching control over the switching fabric of the egress node,
      fragmenting the packet into cells of a fixed length,
      affixing a cell header including said first in-band control signal, said route tag and said last in-band control signal in front of each one of the cells,
      deploying said first in-band control signal in the cell header of each one of the cells to guide said each one of the cells through the ingress node, and
      consuming said first in-band control signal from the cell header of said each one of the cells,
   in the j-th node on the route, 2≦j≦(k−1),
      inserting a j-th in-band control signal into the cell header of each one of the cells for the switching control over the switching fabric of said j-th node on the route, wherein said j-th in-band control signal is derived from the route tag in the cell header of each one of the cells,
      deploying said j-th in-band control signal in the cell header of each one of the cells to guide said each one of the cells through said j-th node on the route, and
      consuming said j-th in-band control signal from the cell header of each one of the cells, and
   in the egress node of the network,
      deploying the last in-band control signal for the egress node in front of each one of the cells to guide said each one of the cells through the egress node, and
      reassembling the cells into the packet.

4. The method as recited in claim 3 wherein the translating in the ingress node includes translating the routing information into, apart from the first in-band control signal and the second in-band control signal, a route tag which is an identifier of the egress node.

5. A method for routing a packet through a network composed of a plurality of switches as nodes, each of the nodes having a switching fabric, the packet having a packet header containing routing information and destined to traverse the network via a route which is determined by a sequence of k nodes, k≧1, wherein the first of the sequence of nodes is the ingress node through which the packet enters the network, the last of the sequence of nodes is the egress node through which the packet exits from the network, the method comprising    in the ingress node of the network,
      translating the routing information into a first in-band control signal for the switching control over the switching fabric of the ingress node, a first route tag for the use of the second node on the route, and a last in-band control signal for the switching control over the switching fabric of the egress node,
      fragmenting the packet into cells of a fixed length,
      affixing a cell header including said first in-band control signal, said first route tag and said last in-band control signal in front of each one of the cells,
      deploying said first in-band control signal in the cell header of each one of the cells to guide said each one of the cells through the ingress node, and
      consuming said first in-band control signal from the cell header of said each one of the cells,
   in the j-th node on the route, 2≦j≦(k−1),
      inserting a j-th in-band control signal into the cell header of each one of the cells for the switching control over the switching fabric of said j-th node on the route, wherein said j-th in-band control signal is derived from the route tag in the cell header of each one of the cells,
      generating a j-th route tag for the use of the (j+1)-th node on the route based on the (j−1)-th route tag generated in the (j−1)-th node on the route to replace said (j−1)-th route tag in the cell header of each one of the cells,
      deploying said j-th in-band control signal in the cell header of each one of the cells to guide said each one of the cells through said j-th node on the route, and
      consuming said j-th in-band control signal from the cell header of each one of the cells, and
   in the egress node of the network,
      deploying the last in-band control signal for the egress node in front of each one of the cells to guide said each one of the cells through the egress node, and
      reassembling the cells into the packet.

6. A method for routing a packet through a packet switching network including a plurality of nodes, each of the nodes including a switching fabric with a plurality of input ports, a plurality of output ports, and a plurality of line cards wherein each of the line cards contains an input module and an output module, the packet carrying a packet header containing the routing information and destined to traverse the network via a route which is determined by a sequence of k nodes, k≧1, wherein the first of the sequence of nodes is the ingress node through which the packet enters the network, the last of the sequence of nodes is the egress node through which the packet exits from the network, and wherein each of the sequence of nodes on the route has an active input module through which the packet enters the node and an active output module through which the packet exits from the node, the method comprising:

at the active input module of the ingress node, wherein the active input module of the ingress node has a first packet-forwarding table,
      translating the routing information, using said first packet-forwarding table, into a first in-band control signal for the switching control over the switching fabric of the ingress node, a route tag, and a last in-band control signal for the switching control over the switching fabric of the egress node,
      fragmenting the packet into cells of a fixed length,
      affixing a cell header including said first in-band control signal, said route tag and said last in-band control signal in front of each one of the cells, and
      forwarding each one of the cells to the input port of the switching fabric coupled to the active input module of the ingress node, at the switching fabric of the ingress node,
  routing each one of the cells through the switching fabric of said j-th node, using said first in-band control signal in front of each one of the cells, to the output port of the switching fabric coupled to the active output module of the ingress node, and
  consuming said first in-band control signal from the cell header of said each one of the cells,
at the active input module of the j-th node on the route, $2 \leq j \leq (k-1)$, wherein said active input module has a j-th packet-forwarding table which is smaller than the first packet-forwarding table,
  receiving each one of the cells from the (j−1)-th node on the route,
  inserting a j-th in-band control signal into the cell header of each one of the cells for the switching control over the switching fabric of said j-th node on the route, wherein said j-th in-band control signal is derived from the route tag in the cell header of each one of the cells using said j-th packet-forwarding table, and
  forwarding each one of the cells to the input port of the switching fabric coupled to the active input module of said j-th node,
at the switching fabric of the j-th node on the route, $2 \leq j \leq (k-1)$,
  routing each one of the cells through the switching fabric of said j-th node, using the j-th in-band control signal in the cell header of each one of the cells, to the output port of the switching fabric coupled to the active output module of said j-th node, and
  consuming said j-th in-band control signal from the cell header of said each one of the cells,
at the active output module of the j-th node on the route, $1 \leq j < k$, transmitting each one of the cells to the (j+1)-th node on the route,
at the active input module of the egress node,
  receiving each one of the cells from the (k−1)-th node on the route, and
  forwarding each one of the cells to the input port of the switching fabric coupled to the active input module of the egress node,
at the switching fabric of the egress node,
  routing each one of the cells through the switching fabric of said j-the node, using the last in-band control signal in the cell header of each one of the cells, to the output port of the switching fabric coupled to the active output module of the egress node, and
  consuming said last in-band control signal from the cell header of said each one of the cells, and
at the active output module of the egress node, reassembling the cells into the packet.

7. The method as recited in claim 6 wherein the translating in the ingress node includes translating the routing information into, apart from the first in-band control signal and the second in-band control signal, a route tag which is an identifier of the egress node.

8. A method for routing a packet through a packet switching network comprising a plurality of nodes, each of the nodes including a switching fabric with a plurality of input ports and a plurality of output ports, the packet carrying a packet header containing the routing information and destined to traverse the network via a route which is determined by a sequence of k nodes, $k \geq 1$, wherein the first of the sequence of nodes is the ingress node through which the packet enters the network, the last of the sequence of nodes is the egress node through which the packet exits from the network, the method comprising:
in the ingress node on the route,
  determining whether the ingress node is the egress node by examining the routing information of the packet,
  if the ingress node is the egress node, translating the routing information into just a last in-band control signal for the switching control over the switching fabric of the egress node, fragmenting the packet into cells of a fixed length, affixing said last in-band control signal in front of each one of the cells, deploying said last in-band control signal in front of each one of the cells to guide said each one of the cells through the egress node, and reassembling the cells into the packet,
  if the ingress node is not the egress node, translating the routing information into a first in-band control signal for the switching control over the switching fabric of the ingress node, a route tag, and a last in-band control signal for the switching control over the switching fabric of the egress node, fragmenting the packet into cells of a fixed length, affixing a cell header including said first in-band control signal, said route tag and said last in-band control signal in front of each one of the cells, deploying said first in-band control signal in front of each one of the cells to guide said each one of the cells through the ingress node, consuming said first in-band control signal from each one of the cells, and transmitting each one of the cells to the next succeeding one of the sequence of nodes on the route,
in the j-th node on the route, $2 \leq j \leq k$,
  receiving each one of the cells from the (j−1)-th node on the route,
  determining whether said j-th node is the egress node by examining the route tag in the cell header of each one of the cells,
  if said j-th node is the egress node, deploying the last in-band control signal in the cell header of each one of the cells to guide said each one of the cells through the egress node, and reassembling the cells into the packet,
  if said j-th node is not the egress node no, inserting a j-the in-band control signal into the cell header of each one of the cells for the switching control over the switching fabric of said j-th node on the route, wherein said j-th in-band control signal is derived from the route tag in the cell header of each one of the cells, deploying said j-th in-band control signal in the cell header of each one of the cells to guide said each one of the cells through said each one of the sequence of nodes on the route, consuming said j-th in-band control signal from the cell header of each one of the cells, and transmitting each one of the cells to the (j+1)-th node on the route.

9. The method as recited in claim 8 wherein the translating in the ingress node includes translating the routing information into, apart from the first in-band control signal and the second in-band control signal, a route tag which is an identifier of the egress node.

10. A system for routing a packet through a network composed of a plurality of switches as nodes, each of the nodes having a switching fabric, the packet having a packet header containing routing information and destined to traverse the network via a route which is determined by a sequence of k nodes, k>1, wherein the first of the sequence of nodes is the ingress node through which the packet enters the network, the last of the sequence of nodes is the egress node through which the packet exits from the network, the system comprising:

in the ingress node of the network,
      a translator for translating the routing information into a first in-band control signal for the switching control over the switching fabric of the ingress node, a route tag, and a last in-band control signal for the switching control over the switching fabric of the egress node,
      means for fragmenting the packet into cells of a fixed length,
      means for affixing a cell header including said first in-band control signal, said route tag and said last in-band control signal in front of each one of the cells,
      means for deploying said first in-band control signal in the cell header of each one of the cells to guide said each one of the cells through the ingress node, and
      means for consuming said first in-band control signal from the cell header of said each one of the cells,    in the j-th node on the route, $2 \leq j \leq (k-1)$,
      means for inserting a j-th in-band control signal into the cell header of each one of the cells for the switching control over the switching fabric of said j-th node on the route, wherein said j-th in-band control signal is derived from the route tag in the cell header of each one of the cells,
      means for deploying said j-th in-band control signal in the cell header of each one of the cells to guide said each one of the cells through said j-th node on the route, and
      means for consuming said j-th in-band control signal from the cell header of each one of the cells, and    in the egress node of the network,
      means for deploying the last in-band control signal for the egress node in front of each one of the cells to guide said each one of the cells through the egress node, and
      a reassembler for reassembling the cells into the packet.

* * * * *